United States Patent [19]

Gupta et al.

[11] Patent Number: 5,670,116
[45] Date of Patent: Sep. 23, 1997

[54] HYDROPROCESSING REACTOR WITH ENHANCED PRODUCT SELECTIVITY

[75] Inventors: Ramesh Gupta, Berkeley Heights; Edward S. Ellis, Basking Ridge, both of N.J.

[73] Assignee: Exxon Research & Engineering Company, Florham Park, N.J.

[21] Appl. No.: 567,450

[22] Filed: Dec. 5, 1995

[51] Int. Cl.$^6$ .................................................. B01J 8/04
[52] U.S. Cl. .................. 422/191; 422/194; 422/195; 422/196; 422/217; 422/111; 422/112
[58] Field of Search .................................. 422/194, 191, 422/195, 196, 217, 111, 112

[56] References Cited

U.S. PATENT DOCUMENTS

| | | | |
|---|---|---|---|
| 2,006,078 | 6/1935 | Pyzel | 422/195 |
| 2,248,734 | 7/1941 | Barr | 422/191 |
| 2,916,527 | 12/1959 | Adams et al. | 260/660 |
| 3,048,468 | 8/1962 | Watkins | 23/1 |
| 4,089,752 | 5/1978 | Hancock | 203/99 |
| 4,293,315 | 10/1981 | Sederquist | 48/94 |
| 4,313,908 | 2/1982 | Gupta | 422/111 |
| 4,330,505 | 5/1982 | Gupta | 422/217 |
| 4,380,529 | 4/1983 | Gupta | 422/220 |
| 4,385,033 | 5/1983 | Gupta | 422/217 |
| 4,482,523 | 11/1984 | Peterson | 422/148 |
| 5,013,407 | 5/1991 | Nocca et al. | 202/158 |
| 5,026,459 | 6/1991 | Quang et al. | 202/158 |
| 5,130,102 | 7/1992 | Jones, Jr. | 422/191 |

Primary Examiner—Nina Bhat
Attorney, Agent, or Firm—Henry E. Nayler

[57] ABSTRACT

Petroleum reactors are provided which are comprised of one or more serially disposed reaction zones, each zone containing a suitable catalyst, wherein each reaction zone is followed by a non-reaction zone. One or more of said reaction zones contains a vapor by-pass means such that the vapor from one or more upstream non-reaction zones by-passes one or more downstream reaction zones and is introduced into a downstream non-reaction zone.

10 Claims, 2 Drawing Sheets

FIG. 1
FIG. 2
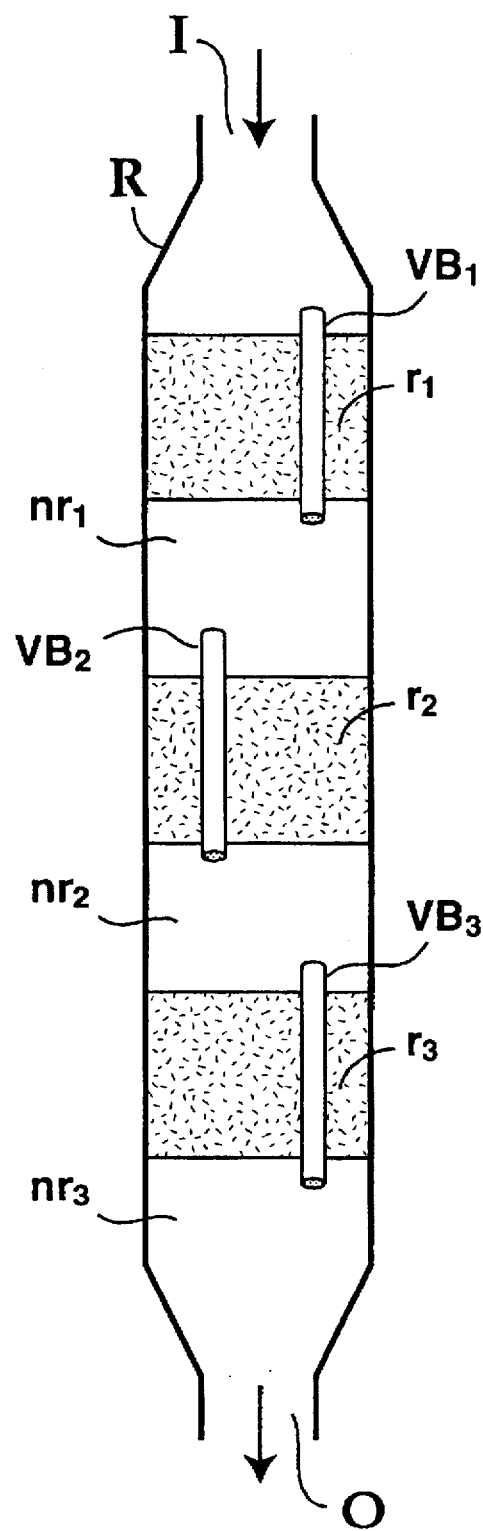
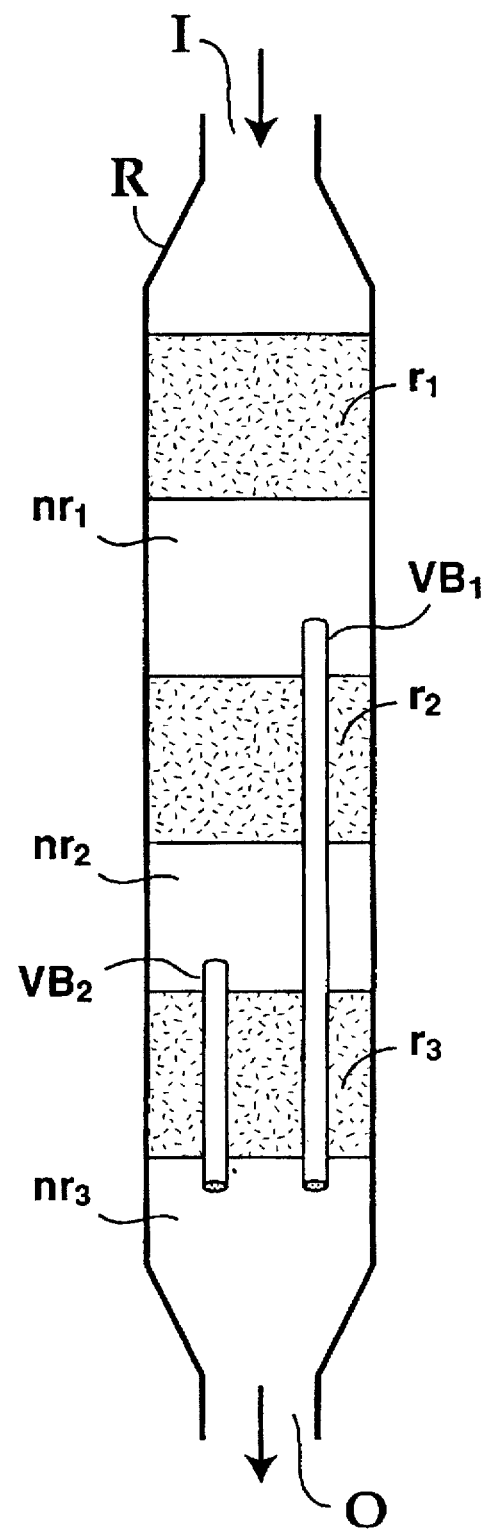

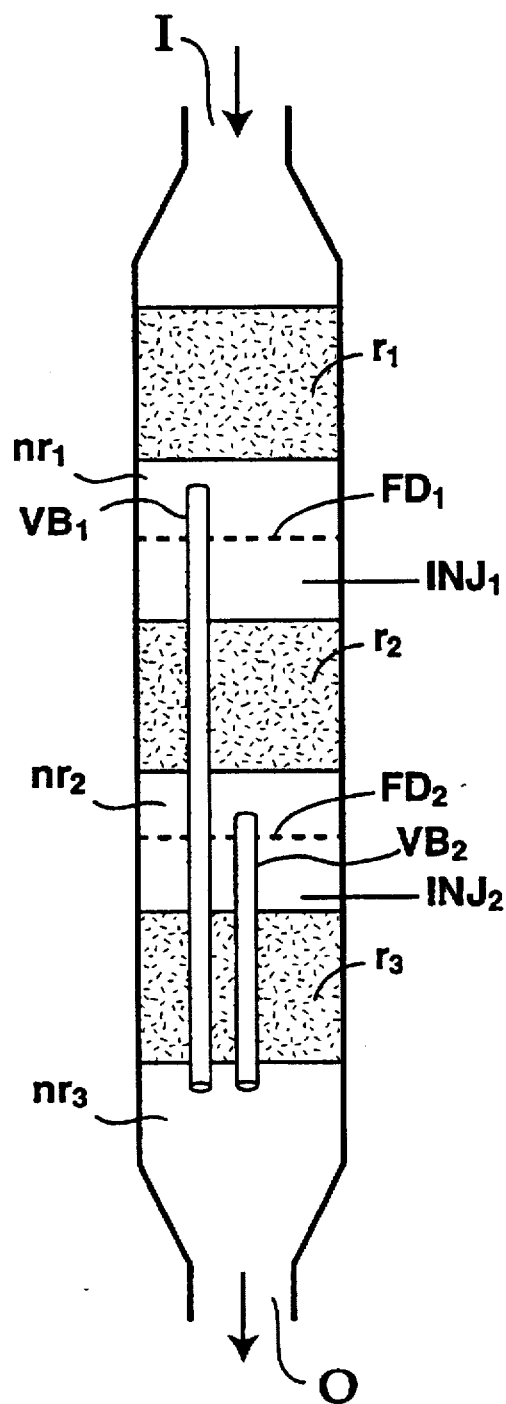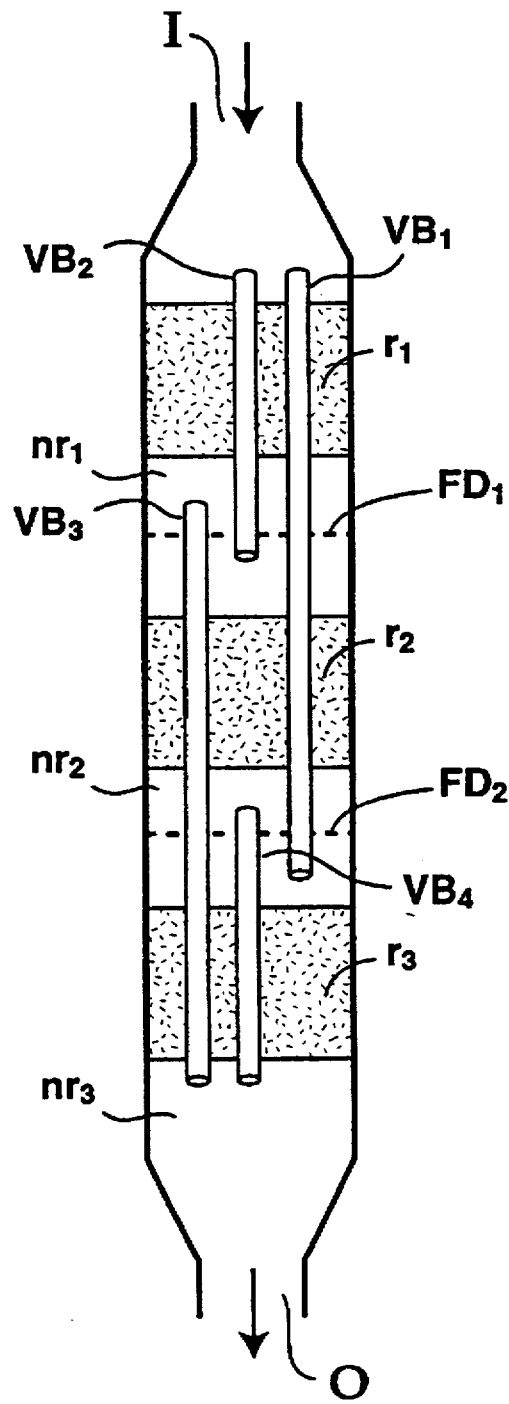

//...

HYDROPROCESSING REACTOR WITH ENHANCED PRODUCT SELECTIVITY

FIELD OF THE INVENTION

The present invention relates to petroleum reactors comprised of one or more serially disposed reaction zones, each zone containing a suitable catalyst, wherein each reaction zone is followed by a non-reaction zone. One or more of said reaction zones contains a vapor by-pass means such that the vapor from one or more upstream non-reaction zones by-passes one or more downstream reaction zones and is introduced into a downstream non-reaction zone.

BACKGROUND OF THE INVENTION

Reactors having one or more reaction zones, each comprised of a suitable catalyst, are common in the petroleum and petrochemical industries. Such reactors are used in the petroleum industry in processes such as hydrocracking, hydrotreating, and hydroconversion. In such processes, a petroleum feedstock is catalytically reacted in the presence of hydrogen, in one or more reaction zones, at elevated temperatures and pressures, to obtain lower boiling products, to remove heteroatoms such as sulfur, or both. In conventional reactors containing more than one reaction zone, the entire reaction product from the first reaction zone is typically passed to the next downstream reaction zone from which the entire reaction product is then passed to the next downstream reaction zone, until the last reaction zone, after which it exits the reactor. The use of more than one serially disposed reaction zone serves to increase conversion, but it has the disadvantage of enabling undesirable secondary cracking to occur. That is, at typical operating conditions a substantial amount of the product will be a vapor phase product which undergoes secondary cracking when exposed to an additional charge of catalyst in a downstream reaction zone, thereby producing less valuable products and consuming excessive amounts of hydrogen.

The conventional approach to solve these problems is to develop catalysts which minimize secondary cracking, or to run the reaction zones at relatively low conversion conditions. Both of these approaches have disadvantages. For example, there are presently no catalysts which satisfactorily meet these requirements and second, running at low conversion penalizes product yield.

Therefore, there is a need in the art for improved reactor designs which can achieve relatively high feedstock conversion without sacrificing product yield to lower valued products through the secondary cracking of reaction products.

SUMMARY OF THE INVENTION

In accordance with the present invention, there is provided a reactor for reacting a petroleum or petrochemical feedstock, at elevated temperatures and pressures, in the presence of a vapor phase, which reactor is comprised of two or more serially disposed reaction zones wherein each reaction zone contains a suitable catalyst and wherein each reaction zone is immediately followed by a non-reaction zone and wherein one or more of the reaction zones contains a vapor by-pass means so that a portion of the vapor product from an upstream non-reaction zone can be passed directly to a downstream non-reaction zone without contacting the catalyst of the by-passed reaction zone.

In a preferred embodiment of the present invention, each reaction zone contains a vapor by-pass means that allows a portion of the vapor from the immediate upstream non-reaction zone to be passed to the next downstream non-reaction zone without coming into contact with catalyst of said next downstream reaction zone.

In another preferred embodiment of the present invention, the vapor by-pass means is a tubular structure which passes through at least one reaction zone.

In still another embodiment of the present invention the reactor is such as to allow vapor product to by pass two or more consecutive reaction zones.

In yet another preferred embodiment of the present invention, the vapor by-pass means are tubular means which are situated outside of the reactor and which fluidly connect one or more non-reaction zones.

In yet another embodiment of the present invention, the vapor by-pass means are tubular means which include a flow control means which enables control of the flow rate of the by-passed vapor.

In still other preferred embodiments of the present invention, the catalyst of the reaction zones are in fixed-beds and one or more or the non-reaction zones contains a fluid distributor means to substantially uniformly distribute fluid from an upstream reaction zone to the next downstream reaction zone.

In other preferred embodiments of the present invention, the distributor means is used to enable selective by-pass of a portion of the vapor in a non-reaction zone upstream of the distributor means, prior to introduction of fresh treat gas.

BRIEF DESCRIPTION OF THE FIGURES

FIG. 1 is a reactor of the present invention wherein each reaction zone contains a vapor by-pass means such that each non-reaction zone is in fluid communication with the next downstream non-reaction zone.

FIG. 2 is a reactor of the present invention wherein two consecutive reactions zones and a non-reaction zone are by-passed by a tubular by-pass means. This arrangement allows a portion of the primary cracked products from any reaction zone to exit the reactor without undergoing undesirable secondary reactions in a downstream reaction zone.

FIG. 3 is another embodiment of the present invention wherein hydrogen treat gas is added in stages along the reactor length and at the same time, a portion of the vapor product from each reaction zone is removed from the reactor using vapor by-pass tubes. Flow distribution means are also generally depicted in the non-reaction zones of the reactor.

FIG. 4 is a reactor of the present invention wherein product vapor by-passing is practiced as shown in FIG. 2 hereof, but wherein a portion of the feed vapor, which is hydrogen-rich, by-passes the first reaction zone and is passed to intermediate non-reaction zones to replenish hydrogen which has been consumed by the reaction taking place in an upstream reaction zone. The product vapor is withdrawn from above a distribution tray.

DETAILED DESCRIPTION OF THE INVENTION

The present invention is suitable for use with any reactor containing more than one serially disposed reaction zones containing catalysts and which is designed to operate at elevated temperatures and pressures. Such reactors are typically used for the conversion or treatment of petroleum or petrochemical feedstocks in the presence of a vapor phase, such as a hydrogen treat gas. Non-limiting reactors for which the present invention is suitable for use include those used for the hydroconversion of heavy petroleum feedstocks to lower boiling products; the hydrocracking of distillate boiling range feedstocks; and hydrotreating of various petroleum feedstocks, such as naphtha and distillate boiling range streams. More particularly, the reactors on which the present invention are practiced are those which employ two or more serially disposed reaction zones, each containing a suitable catalyst, and each followed by a non-reaction zone. The non-reaction zone can serve several purposes. For example, a fluid may be injected into the non-reaction zone to control the temperature of the mixture entering the next reaction zone. For exothermic reactions, such as hydrocracking and hydrogenation, this can be used to limit temperature rise. The non-reaction zone can also be used to allow installation of a flow distribution tray which helps to uniformly distribute the reactor fluids entering the next reaction zone. The non-reaction zone can also be a zone wherein a portion of the feedstock, or product stream, is injected. A treat gas, preferably a hydrogen-containing treat gas, can also be injected into the one or more non-reaction zones Reference is now made to FIG. 1 herein which shows reactor R which contains inlet I for receiving a feedstock to be treated, and an outlet O for removing reaction product. The reactor contains three serially disposed reaction zones, $r_1$, $r_2$, and $r_3$. Each reaction zone is followed by a non-reaction zone, $nr_1$, $nr_2$, and $nr_3$. Each reaction zone contains a suitable catalyst for the desired reaction. For example, if the desired reaction is hydrotreating wherein heteroatoms are removed, the catalyst will preferably be comprised of an effective amount of one or more Group VIII metals, such as Ni, and/or Co; and an effective amount of one or more Group VI metals, such as Mo, or W. If the desired reaction is hydrocracking, the catalyst will be a conventional hydrocracking which are typically comprised of an effective amount of Group VIII noble metal, such as Pt, on a suitable support, such as a zeolite. The reactor illustrated in FIG. 1 shows vapor by-pass means $VB_1$, $VB_2$, and $VB_3$.

The reactor of FIG. 1 is operated by introducing the feedstock to be treated into inlet I of reactor R, along with a suitable treat gas, such as a hydrogen-containing gas, preferably hydrogen. The reactor is operated at suitable temperatures and pressures for the desired reaction. For example, typical hydrotreating temperatures will range from about 100° C. to about 400° C. at pressures from about 50 psig to about 2,000 psig. Typical hydrocracking temperatures will be from about 200° C. to about 400° C. at pressures from about 200 psig to about 2,000 psig, or higher. The major portion of the feedstream passes through reaction zone $r_1$, which is comprised of a suitable catalyst, where it reacts with the catalyst and produces a reaction product, some of which will be a vapor phase product, all of which enters non-reaction zone $nr_1$. A portion of the feedstream will be in the vapor phase, which along with a portion of the treat gas will by-pass reaction zone $r_1$ via by-pass means $VB_1$ and pass to non-reaction zone $nr_1$ without coming into contact with the catalyst of reaction zone $r_1$. All unvaporized feed, as well as some treat gas, preferably a hydrogen-containing treat gas, will pass through the reaction zone $r_1$ where it will contact the catalyst and be converted to reaction products which pass into non-reaction zone $nr_1$. A portion of the vapor phase product now in non-reaction zone $nr_1$ will by-pass the catalyst of reaction zone $r_2$ by passing through by-pass means $VB_2$ to non-reaction zone $nr_2$ without contacting catalyst of reaction zone $r_2$, and thus, not undergoing undesirable secondary cracking. Liquid reaction product, as well as a portion of the vapor phase product from reaction zone $r_1$ will pass into non-reaction zone $nr_2$ after contacting the catalyst in reaction zone $r_2$. A portion of the vapor phase product in non-reaction zone $nr_2$ will pass through vapor by-pass means $VB_3$ to non-reaction zone $nr_3$. The vapor phase product which by-passed reaction zone $r_3$ and the product which resulted from passing through reaction zone $r_3$, exit reactor R via outlet O for downstream processing and fractionation.

The vapor by-pass means can be any suitable structure. It is preferred that the vapor by-pass means be a tubular structure constructed from a material that can withstand the operating conditions of the reaction zone. Suitable materials include metals, such as stainless and carbon steels; ceramic materials, as well as high performance composite materials such as carbon fiber reinforced material. The preferred material for use in the present invention is stainless steel. It is to be understood that the tubulars can be of any suitable diameter depending on the amount and rate of vapor one wishes to move from one non-reaction zone to another. Also, more than one by-pass means can be located through any one or more reaction zones. The by-pass means can also be located external to the reactor. That is, a tubular arrangement can be used on the outside of the reactor so that one or more non-reaction zones are in fluid contact with any or more other non-reaction zones. The by-pass means may contain a flow control means to control the fraction of vapors which are passed from one non-reaction zone to another downstream non-reaction zone. If the vapor by-pass means are external to the reactor, then it is preferred that the flow control means be simply a flow control valve. If internal, the flow control means can be of a solenoid type that can withstand the process conditions of the reaction zone.

FIG. 2 hereof represents another reactor of the present invention, also containing reaction zones $r_1$, $r_2$, and $r_3$; non-reaction zones $nr_1$, $nr_2$, and $nr_3$, vapor by-pass means $VB_1$ and $VB_2$; inlet I; and outlet O. Feedstock, and a suitable treat gas, are introduced into reactor R via inlet I. The reactor is operated at suitable temperatures and pressures for the desired reaction. The entire feed and treat gas stream passes through reaction zone $r_1$ where it reacts with the catalyst and produces a reaction product, some of which will be in vapor phase, all of which enters non-reaction zone $nr_1$. A portion of the vapor phase product from non-reaction zone $nr_1$ will by-pass reaction zones $r_2$ and $r_3$ by passing through by-pass means $VB_1$ directly into non-reaction zone $nr_3$ without contacting catalyst of reaction zone $r_2$ and reaction zone $r_3$. Liquid reaction product, as well as the remaining portion of the vapor phase product from reaction zone $r_1$ will pass through reaction zone $r_2$ into non-reaction zone $nr_2$. A portion of the vapor phase product in non-reaction zone $nr_2$ will pass directly to non-reaction zone $nr_3$ via $VB_2$ where it exits the reactor.

For simplicity of presentation, flow distributors are not identified in FIG. 1 or FIG. 2. However, it is well known in the art that in the presence of a two-phase mixture, a flow distribution means would be employed above each catalyst bed for the purpose of uniformly distributing reactants entering the reaction zone.

FIG. 3 hereof is another embodiment of the present invention wherein the labeled parts are the same as for the previous two figures except for the identification of flow distributor means $FD_1$ and $FD_2$, as well as treat gas injection at $INJ_1$ and $INJ_2$. In this FIG. 3, treat gas is introduced with the feedstream at inlet I, as well as being injected into one or more non-reaction zones via $INJ_1$ and $INJ_2$. It is also understood that another fluid can be injected at $INJ_1$ and $INJ_2$ for temperature control. A portion of the vapor product from each reaction zone is removed from the reactor using vapor by-pass tubes $VB_1$ and $VB_2$. It will be noted that the treat gas is added downstream of the flow distributor means while the vapor product is withdrawn upstream of the flow distributor means in the non-reaction zone. This arrangement prevents undesirable mixing of the injected treat gas with the vapors which are to be withdrawn. The net effect is that a higher hydrogen partial pressure is obtained in the downstream reaction zone. The flow distributor means can be any suitable means for substantially uniformly distributing the stream to the next downstream reaction zone. Non-limiting examples of suitable flow distributor means include: flow distribution trays with multiple bubble caps or multiple tubes. These distribution trays help to uniformly distribute the reaction mixture entering the downstream catalyst zone.

FIG. 4 hereof shows a reactor similar to that of FIG. 3 except by-pass tubes $VB_1$ and $VB_2$ are used for the staged injection of feed and treat gas. Again, the treat gas should be injected below the flow distribution means and the product vapors withdrawn upstream of the flow distributor means. The reactor of FIG. 4 also shows a portion of the vaporized fraction of feedstock and treat gas by-pass at least one upstream reaction zones $r_1$ and/or $r_2$, via by-pass means $VB_1$ and $VB_2$ to non-reaction zones $nr_1$ or $nr_2$. By-pass means $VB_3$ and $VB_4$ show a portion of the vapor product stream by-passing at least one downstream reaction zone $r_2$ and/or $r_3$ to non-reaction zone $nr_3$. It is to be understood that any combination of zones can be by-passed in the practice of the present invention depending on the feedstock used and the desired product slate. FIG. 4 also shows flow distributor means $FD_1$ and $FD_2$.

What is claimed is:

1. A reactor for reacting a petroleum or petrochemical feedstock, at elevated temperatures and pressures, in the presence of a vapor phase, which reactor is comprised of two or more serially disposed reaction zones wherein each reaction zone contains a suitable catalyst and wherein each reaction zone is immediately followed by a non-reaction zone and wherein one or more of the reaction zones includes vapor by-pass means in fluid communication between an upstream non-reaction zone and a downstream non-reaction zone for allowing a portion of the vapor product from the upstream non-reaction zone to pass directly to a downstream non-reaction zone without contacting the catalyst of the by-passed reaction zone.

2. The reactor of claim 1 wherein each reaction zone includes said vapor by-pass means for allowing a portion of the vapor product from the immediate upstream non-reaction zone to pass directly to the next downstream non-reaction zone without contacting the catalyst from the respective reaction zone.

3. The reactor of claim 1 wherein the vapor by-pass means is a tubular conduit which passes through the reaction zone.

4. The reactor of claim 1 wherein the vapor by-pass means allows the vapor product to by-pass two or more consecutive reaction zones.

5. The reactor of claim 1 wherein the vapor by-pass means are tubular conduits which are situated outside of the reactor and which fluidly connect one or more non-reaction zones.

6. The reactor of claim 1 wherein one or more of the vapor by-pass means contains a fluid control valve to control the fraction of vapor which is by-passed from one non-reaction zone to another downstream non-reaction zone.

7. The reactor of claim 1 wherein the catalyst of the reaction zone are fixed-beds of catalyst.

8. The reactor of claim 1 wherein one or more of the non-reaction zones contains fluid distributor means for substantially uniformly distributing fluid from an upstream reaction zone to the next downstream reaction zone.

9. The reactor of claim 8 wherein the fluid distributor means is used to enable selective by-passing of a portion of the vapor in a non-reaction zone upstream of the distributor, prior to introduction of fresh treat gas downstream of the distributor.

10. The reactor of claim 9 wherein the fresh treat gas is introduced via a vapor by-pass means which conducts a portion of the reactor inlet vapor to the non-reaction zone downstream of the fluid distributor means.

* * * * *